Dec. 29, 1959 W. F. NORTHRUP 2,919,044
PRESSURE SENSITIVE TAPE DISPENSER AND APPLIER
Filed April 18, 1957 5 Sheets-Sheet 1
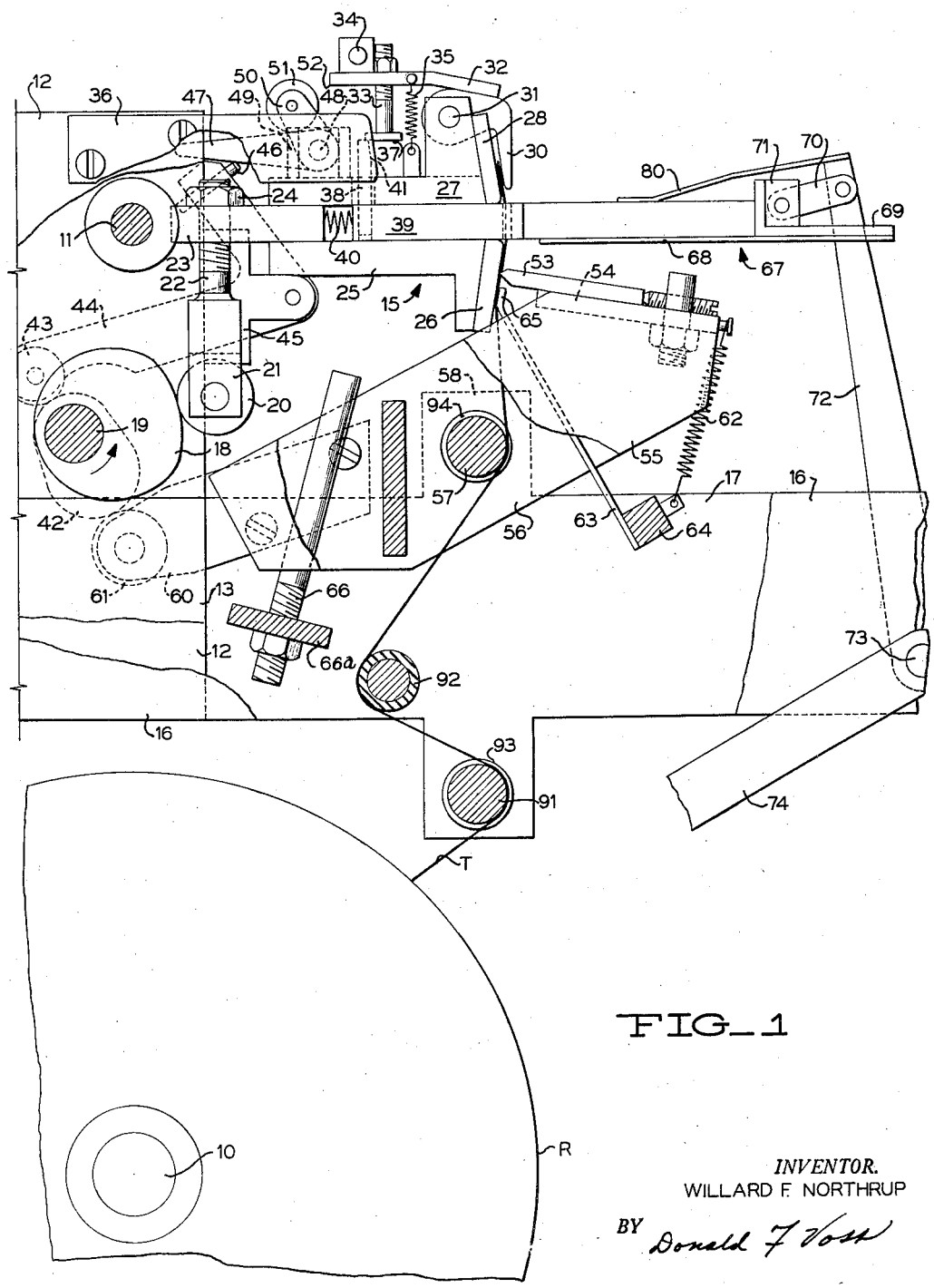
FIG_1
INVENTOR.
WILLARD F. NORTHRUP
BY Donald F. Voss
ATTORNEY

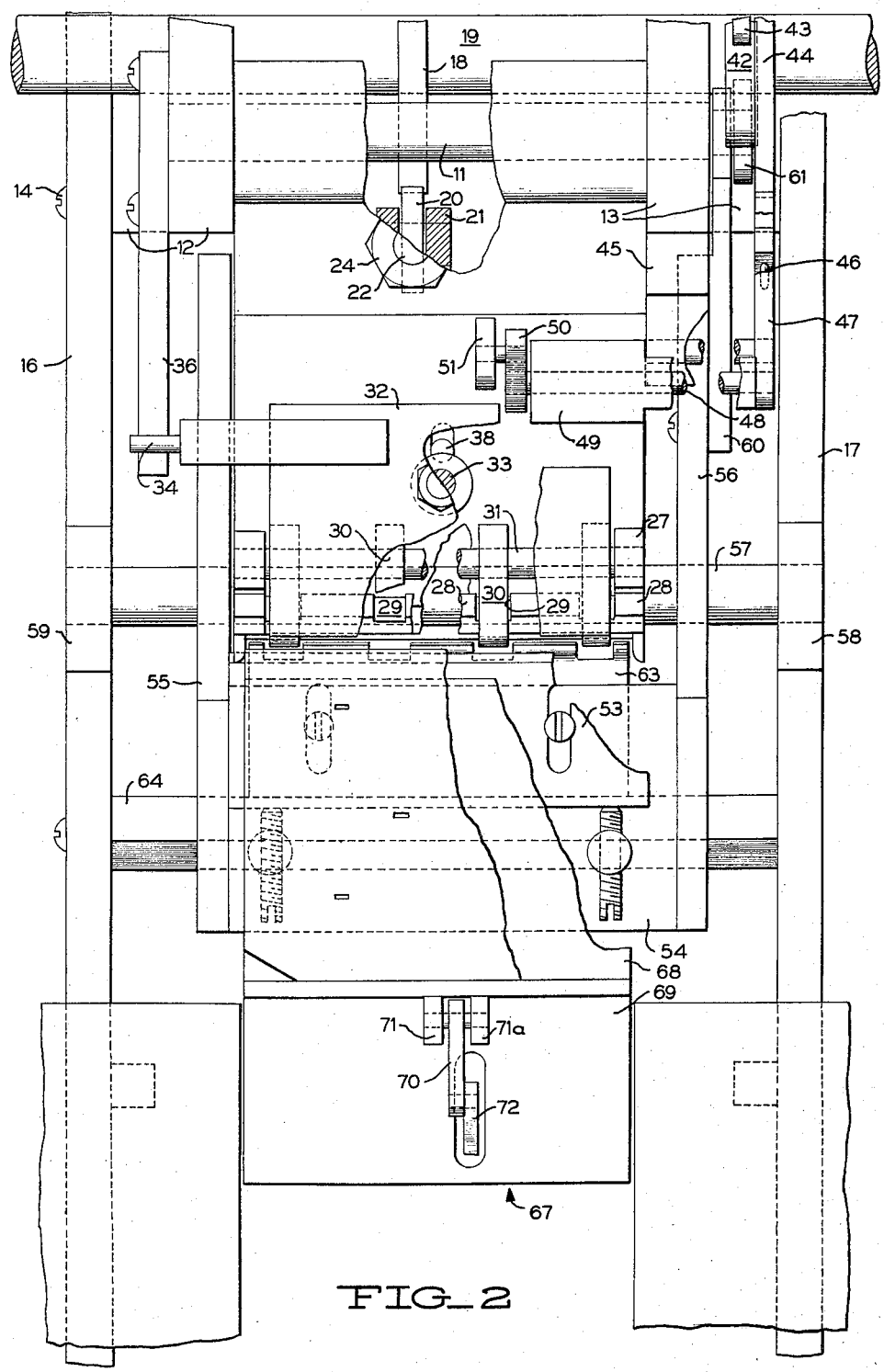
FIG_2

Dec. 29, 1959 W. F. NORTHRUP 2,919,044
PRESSURE SENSITIVE TAPE DISPENSER AND APPLIER
Filed April 18, 1957 5 Sheets-Sheet 3
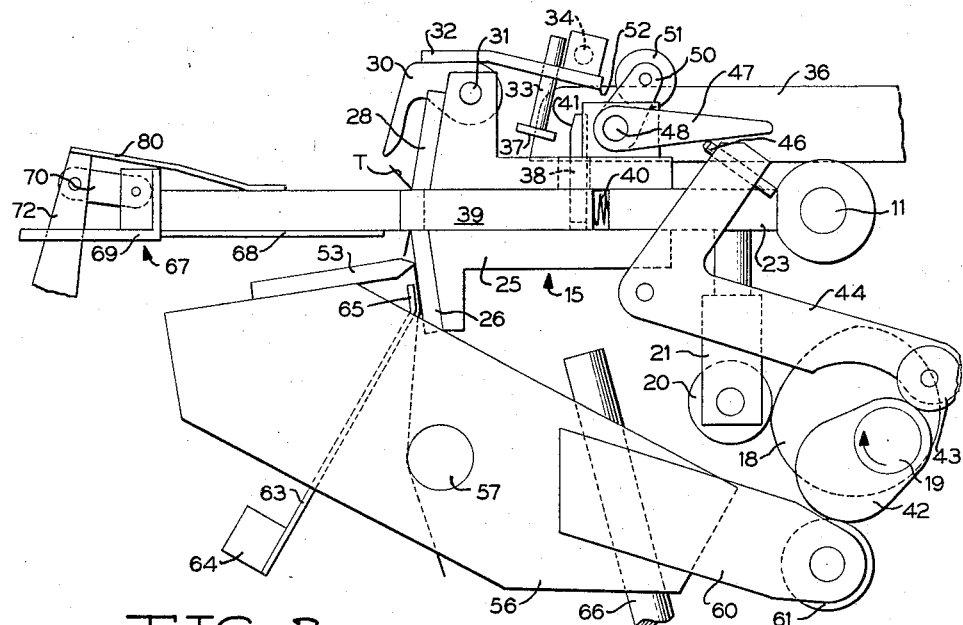
FIG_3
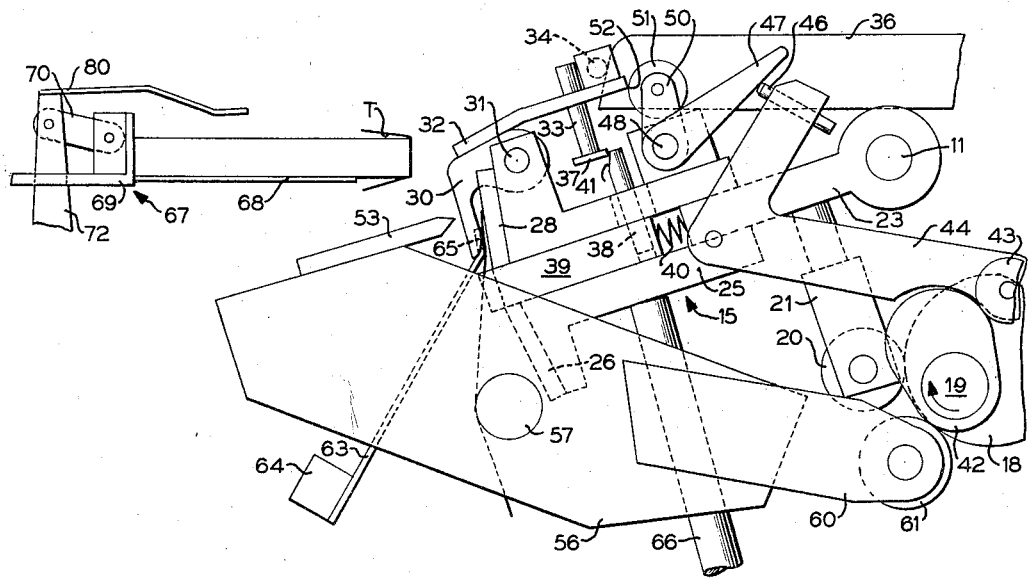
FIG_4

Dec. 29, 1959 W. F. NORTHRUP 2,919,044
PRESSURE SENSITIVE TAPE DISPENSER AND APPLIER
Filed April 18, 1957 5 Sheets-Sheet 4
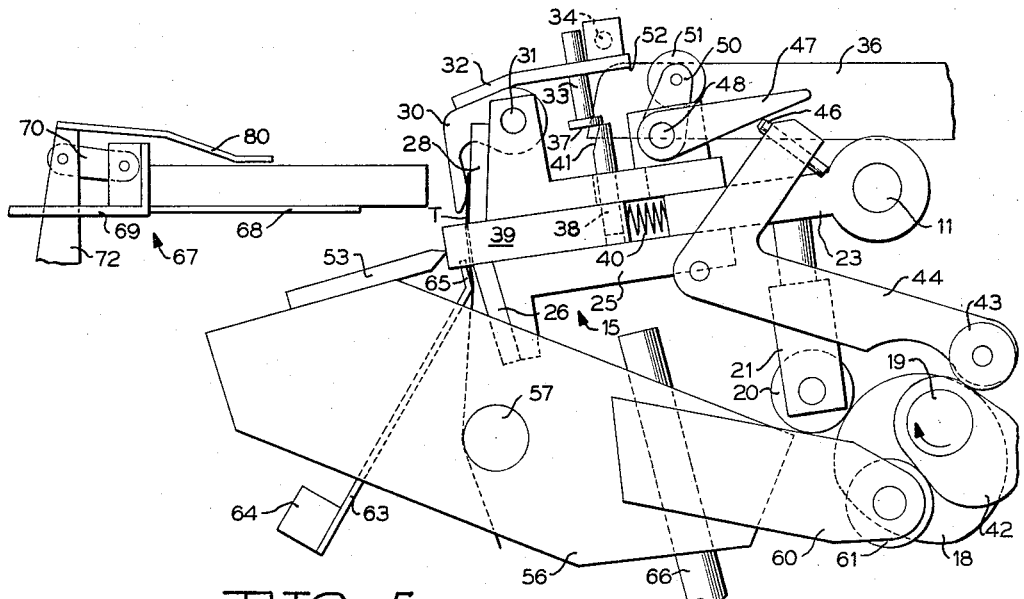
FIG_5
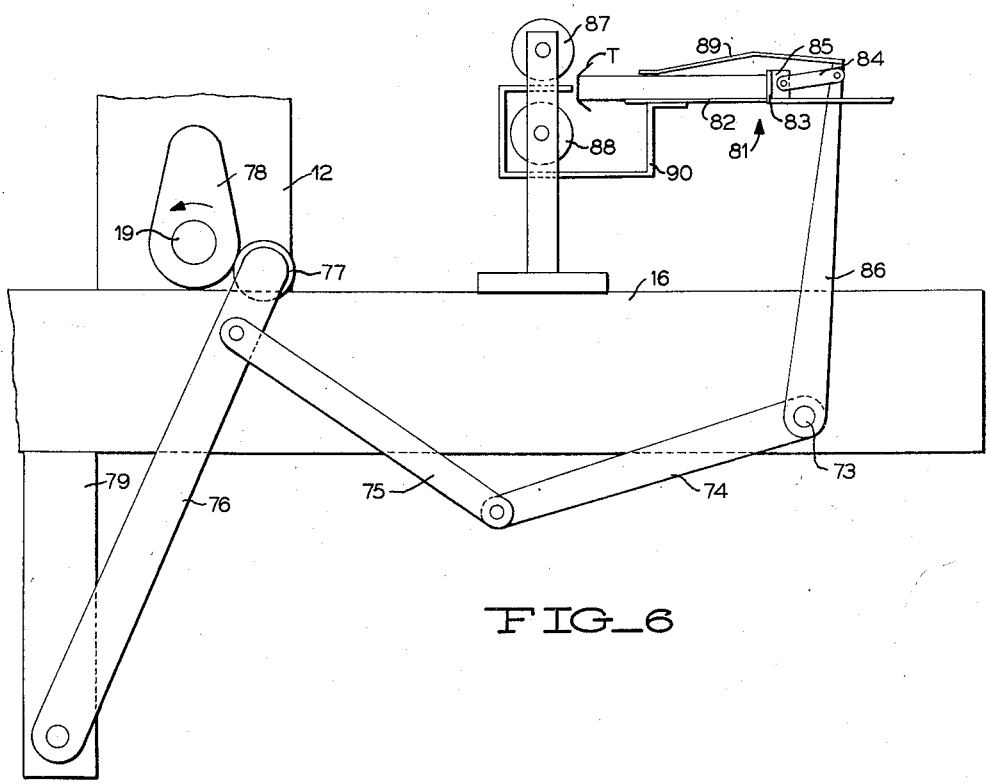
FIG_6

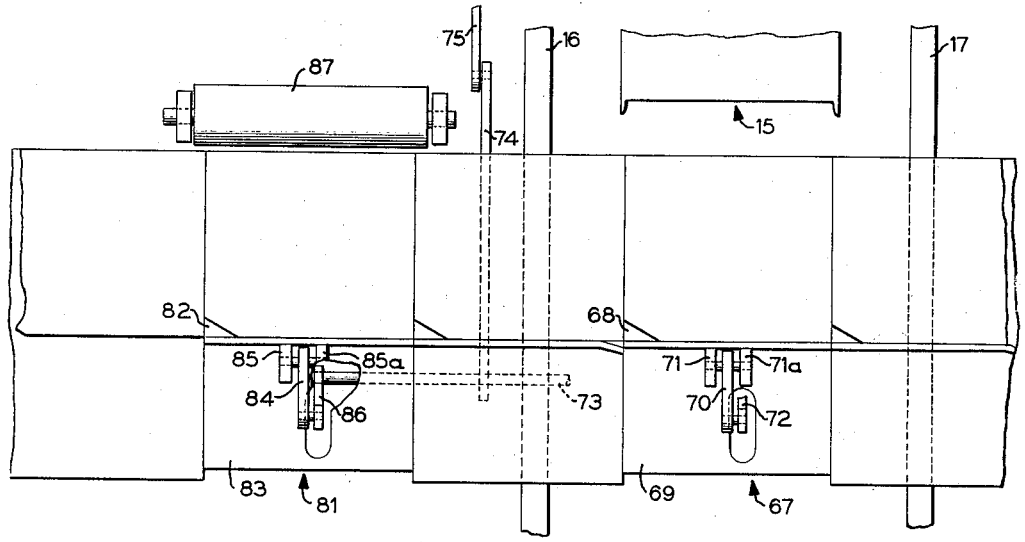
FIG_7
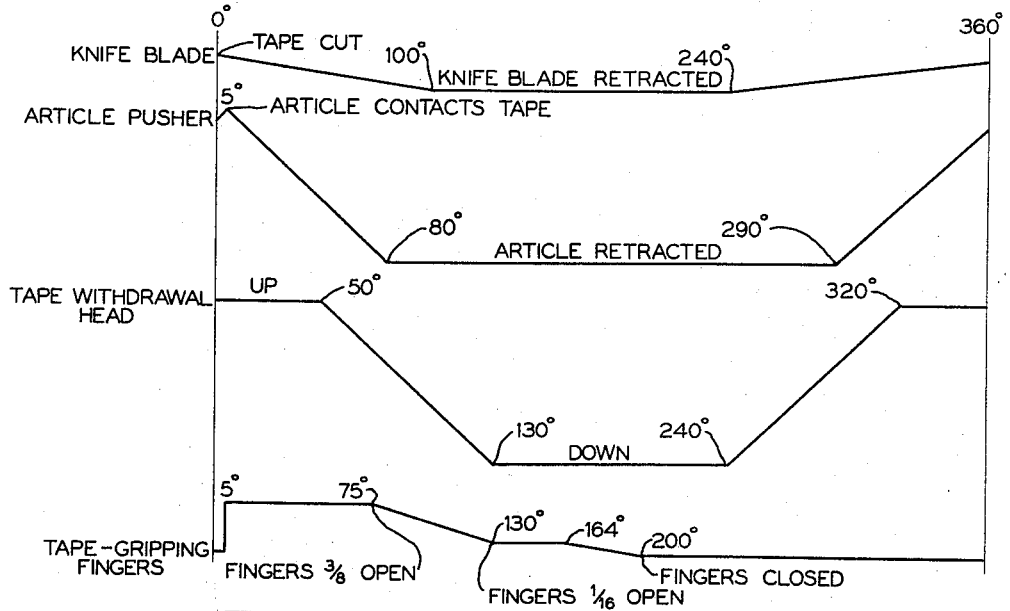
FIG_8

United States Patent Office

2,919,044
Patented Dec. 29, 1959

2,919,044

PRESSURE SENSITIVE TAPE DISPENSER AND APPLIER

Willard F. Northrup, Endicott, N.Y., assignor to International Business Machines Corporation, New York, N.Y., a corporation of New York Application April 18, 1957, Serial No. 653,588

7 Claims. (Cl. 216—29)

This invention relates to devices for dispensing and applying tape and more particularly to devices for dispensing and applying tape coated on one side with a tacky adhesive which is pressure adherent.

Pressure sensitive tape is best handled by maintaining positive control over the tape during dispensing and applying operations rather than relying upon adhesive qualities of the tape for control. However, once the tape is applied to an article, the adhesive qualities of the tape may be relied upon for further processing. Accordingly, it is an object of this invention to provide a device for dispensing and applying tape which has positive control over the tape during the dispensing and applying operation.

This invention is particularly suitable for dispensing and applying pressure sensitive tape to articles to be bound on three sides such as ledger books, check books, coupon books, etc., which may vary in thickness but are uniform in width. Therefore, it is another object of this invention to provide a device for dispensing and applying pressure sensitive tape to articles variable in thickness and uniform in width.

Another object of this invention is to provide a device for dispensing and applying pressure sensitive tape under positive control to articles wherein the articles upon application of the tape release the tape applied from under positive control.

Other objects of the invention will be pointed out in the following description and claims and illustrated in the accompanying drawings, which disclose, by way of examples, the principle of the invention and the best mode, which has been contemplated, of applying that principle.

In the drawings:

Fig. 1 is a left side elevation view of the tape dispensing and applying portion of the machine partially in full line and partially in broken line.

Fig. 2 is a plan view of the tape dispensing and applying portion of the machine partially in full line and partially in broken line.

Fig. 3 is a partial detail view of the tape dispensing and applying portion of the machine showing the tape gripping fingers opening under action of the article receiving the piece of tape dispensed.

Fig. 4 is a partial detail view of the tape dispensing and applying portion of the machine showing the gripping fingers closing to grip the tape from the tape retaining plate.

Fig. 5 is a partial detail view of the tape dispensing and applying portion of the machine showing the tape withdrawal head moving from the tape gripping position to the tape severing position.

Fig. 6 is a detail view of the mechanism for binding the applied tape to an article.

Fig. 7 is a schematic plan view of the tape dispensing and applying mechanism and the tape binding mechanism.

Fig. 8 is a timing diagram showing relative movements of the cutting mechanism, the article pusher, the tape withdrawal head, and the gripping fingers.

This invention is particularly suitable for dispensing and applying pressure sensitive tape to articles moving along an assembly line. For example, coupons may be assembled into stacks or decks in predetermined numbers and then bound by staples or other means. The bound stacks or decks of coupons would then be passed along to a position where the pressure sensitive tape is applied. By standardizing on the width of the coupon, as in the use of tabulating cards for coupons, various lengths of tape of the same width may be dispensed to accommodate decks of coupons varying in thickness or stack height.

The articles to be bound by the pressure sensitive tape move longitudinally in line one after the other into position for the tape to be initially applied and then are moved laterally to engage the tape and after engaging the tape are returned to their in-line position. The articles with the tape initially applied are advanced in line to a position where the tape is bound onto the articles.

Referring to Figs. 1 and 2, a roll R of pressure sensitive tape T is carried on a shaft 10 suitably supported to permit withdrawal of the tape from the roll. The mechanism for withdrawing the tape from the roll R consists of a tape withdrawal head 15 pivotally mounted on a shaft 11 horizontally positioned between laterally spaced vertical frame members 12 and 13, respectively, which are attached to laterally spaced horizontal frame members 16 and 17 by screws 14. The tape withdrawal head 15 is caused to pivot about the shaft 11 by means of a cam 18 fixed to a shaft 19 in a position to coact with a cam follower 20 carried on one end of a forked arm 21 having a threaded portion 22 threaded through a tapped hole in a horizontally extending plate member 23 of the tape withdrawal head 15 and secured with respect thereto by a nut 24. An L-shaped member 25 fixed to the underside of the plate member 23 carries a backing plate 26 to provide a cooperating surface during the tape cutting operation to be described hereinafter. An L-shaped member 27, similar to the L-shaped member 25 but having a U-shaped cutout in the base of the L, is fixed to the top side of the plate member 23 and carries a backing plate 28 having a series of notches 29 to receive a plurality of laterally spaced curved fingers 30 fixed to a shaft 31 journaled in the L-shaped member 27 movable toward and away from the backing plate 28. A plate 32 attached to the fingers 30 to extend rearward therefrom carries a depending stop pin 33 and a horizontally positioned cam follower 34. The fingers 30 are biased away from the backing plate 28 by a spring 35 and in this position the cam follower 34 lies to come in contact with a cam plate 36 fixed to the frame member 12, and the head 37 of the stop pin 33 is in contact with a pin 38 vertically extending through a slot in the L-shaped plate 27 from a block 39 slidably interposed between the L-shaped plate 25 and the L-shaped plate 27. A spring 40 placed between the plate 23 and the block 39 urges the pin 38 in contact with the head 37 of the stop pin 33. The head 37 of stop pin 33 follows along the surface 41 of the pin 38 in an upward directon as the tape withdrawal head is pivoted to grip the tape, Fig. 4, and as the head 37 of the stop pin rises above the top of the pin 38, Fig. 5, the spring 40 urges the block 39 forward so that the pin 38 will lie in a position to interfere with the stop pin 33, thereby preventing the spring 35 from pivoting the fingers 30 to an open position. The fingers 30 are guided to a closed position by the cam follower 34 as it follows the cam 36 when the tape withdrawal head 15 is moved to grip the tape; however, the closing of the fingers 30 to grip the tape T against the backing plate 26 is accomplished by a cam and linkage arrangement, Fig. 4. A cam 42 is fixed along the shaft 19 to coact with a cam follower 43 rotatably attached to one end of a V-shaped arm 44 pivotally mounted at the apex of the V in a bracket 45 fixed to the frame member 12. A pin 46 is threaded into the other end of the arm 44 and protrudes therefrom to be in contact with an arm 47 fixed to a shaft 48 journaled in a rectangular block 49 fixed to the L-shaped plate 27. An arm 50 also fixed to the shaft 48 rotatably carries a roller 51. As the cam 42 causes the arm to pivot counterclockwise, the roller 51 engages the edge 52 of the plate 32 to pivot the fingers 30 into their final gripping position, Fig. 5. This movement is very slight, and the mass of the linkages never moves over center; consequently, the cam follower 43 remains in contact with the cam 42 and the arm 47 remains in contact with the pin 46 without being spring biased. The mechanism for cutting the tape T, Figs. 1 and 2, comprises a knife blade 53 fixed to a plate 54 carried between parallel, laterally spaced arms 55 and 56, respectively, pivotally supported by a shaft 57 journaled in brackets 58 and 59 fixed to the frames 16 and 17, respectively. An arm 60 carrying a cam follower 61 is fixed to the arm 56 so that the cam follower is in contact with the cam 42; a spring 62 maintains the cam follower 61 in contact with cam 42. The movement of the tape withdrawal head 15 and the tape cutting mechanism are so timed with respect to each other that the tape withdrawal head 15 has reached the height of its movement and dwells when the tape cutting mechanism severs the tape T, Fig. 8. The tape T is gripped by the tape withdrawal head 15 from a tape retaining plate 63 attached to a bar 64 fixed between the frame members 16 and 17 and offset at an angle to reside outside of the path of the tape except for the upper end 65 of the retaining plate 63 which lies parallel to the plane of the tape path. The tape T from the supply roll R is initially threaded about a roller 91 journaled between the frame members 16 and 17 with the nonadhesive side of the tape in contact with the roller 91 and about a rubber roller 92 of the type to which the pressure sensitive tape will not adhere, also journaled between the frame members 16 and 17 with the adhesive side of the tape in contact with the silicone rubber roller 92. The tape is threaded from the rubber roller 92 past the shaft 57 with the nonadhesive side in contact with the shaft 57 and stuck onto the retaining plate 63. The tape is guided laterally by flanges 93 on the roller 91 and flanges 94 on the shaft 57. The upper end 65 of the tape retaining plate 63 is notched to permit the fingers to pick the tape therefrom. Downward movement of the tape withdrawal head 15 occurs while the cam follower 20 follows the fall of the cam 18. Hence, the downward movement of the tape withdrawal head 15 is controllable by a stop pin 66 threaded into a plate 66a angularly attached between the frame members 16 and 17. After the tape is cut, the article to be bound is moved to receive the tape. The articles to be taped, Fig. 7, move one after the other; movement of one article from a feeding device, not shown, moves the preceding article. When an article comes into taping position, Figs. 1, 2, and 7, it lies on a slidable pusher 67 having a base plate 68 for supporting the article, and a pusher plate 69 attached to the base plate 68 for moving the article. An arm 70 is attached by suitable fastening means on one end between a rib 71 and a rib 71a fixed to the pusher plate 69 and on its other end to the end of an arm 72 fixed to a shaft 73 journaled in the frame 16. A link 74, Fig. 6, is also attached on one end to the shaft 73 and on its other end to a link 75 which is attached to an arm 76 carrying a cam follower 77 disposed to follow a cam 78 fixed to the shaft 19. The arm 76 is pivotally mounted on one end in a frame member 79 dependingly attached to the frame member 16, see Fig. 6. The relationship of the cams 18, 42, and 78 is such that the tape withdrawal head 15 has withdrawn a predetermined length of tape T at the time the knife 53 is moved into position to cut the tape T and subsequent to the cutting of the tape T, the article to be taped is moved by the pusher 67 against the tacky side of the tape, thereby picking up the cut piece of tape and sliding the block 39 and pin 38 rearward to permit the spring 35 to open the fingers 30, Figs. 3 and 8; hence freely leaving the cut piece of tape on the article which is then retracted into its normal path of movement by means of a spring finger 80 attached to the end of the arm 72 which bears against the article to hold it against the base plate 68 as the arm 72 is pivoted by the shaft 73. When the article has been returned to its normal path, the spring finger 80 has been moved free of the article by the arm 72. The tape attached to the back of the article is bound on the sides of the article after the article is advanced to another station two operating cycles away, Fig. 7. The article at the binding station, Fig. 6, lies on a pusher 81 having a base plate 82 for supporting the article and a pusher plate 83 for moving the article. An arm 84 is attached on one end between ribs 85 and 85a on the back side of the pusher plate 83 and on its other end to the end of an arm 86 which is attached to the shaft 73. As the shaft 73 is pivoted counterclockwise, the article is moved by the pusher 81 between a pair of rubber rollers 87 and 88 rotatably mounted in a manner that the distance between their peripheries is slightly less than the thickness of the article. A spring finger 89 attached to the end of the arm 86 bears against the article as the arm 86 is pivoted, thereby holding the article against the base plate 82. As the article enters between the rollers 87 and 88, the tape is rolled down along the sides, the rollers 87 and 88 being resilient will compress as the article is moved therebetween, and as they do so, the force of compression is exerted against the tape to bind it securely. As the pusher 81 retracts, the article is carried from between the rollers 87 and 88 by a finger plate 90 fixed to the base plate 82 and formed in a manner to come around behind the roller 88 and enter between the rollers 87 and 88. Hence the finger plate 90 moves with the pusher 81, and as the article is carried between the rollers 87 and 88, the finger plate 90 moves from between the rollers 87 and 88, but as the pusher 81 retracts, the finger plate 89 carries the article from between the rollers 87 and 88. The machine driven from a motor, not shown, operably connected to drive the shaft 19, during normal operation runs continuously. Relative movement of the knife blade 53, the pushers 67 and 81, respectively, the tape withdrawal head 15 and the gripping fingers 30 is shown in the timing diagram in Fig. 8.

*Mode of operation*

The lead end of a roll R of pressure sensitive tape T mounted on the shaft 10, Fig. 1, is threaded over the guide roller 91, behind the rubber tension roller 92, past the front of the shaft 57 and stuck against the upper end 65 of the retaining plate 63. With this setup having been made, the motor for rotating the shaft 19 is started. As the shaft rotates the cam 18, the cam follower 20 follows the fall of the cam 18 to allow the tape withdrawal head 15 to move downward to grasp the tape T from the retaining plate 63. The downward movement of the tape withdrawal head 15 which is limited by the stop pin 66 starts at 50° of an operating cycle. During the downward movement of the tape withdrawal head 15, the fingers 30 are guided to close upon the tape T by action of the cam follower 34 following the cam plate 36, this action starts at 75° and is completed at 130° which is at the time the tape withdrawal head 15 has completed its downward movement. The closing of the fingers 30 upon the tape takes place as the arm 50 through the arms 44 and 47 moves the roller 51 against the surface 52 of the plate 32, thereby pivoting the fingers 30 to the closed position. Movement of the fingers 30 to their final closed position starts at 164° and ends at 200°. With the fingers 30 in the closed position, the tape withdrawal head 15 starts moving upward at 240° as the cam follower 20 follows the rise of the cam 18, thereby withdrawing the tape to the desired predetermined length when the cam 18 reaches the height of its rise at 320°. The cam dwells at the height of its rise from 320° to 50° to hold the tape withdrawal head 15 in position for the cutting operation. The knife 53 carried between the arms 55 and 56, respectively, is moved at 240° to cut the tape T by action of the cam 42 through the cam follower 61. The cutting of the tape occurs by the knife 53 pressing into the tape against the backing plate 26 at 360°. During the cutting operation, the tape sticks to the knife blade 53, and as the knife blade 53 is moved away from the backing plate 26 from 0° to 100°, it carries the tape T against the upper end 65 of the retaining plate 63 to position it for a subsequent operation. Of course, the article strips the cut piece of tape from the knife blade 53. The cut piece of tape is applied to the article as the article is moved into contact with it at 5° by the pusher 67 which starts its movement at 290°. When the article is moved to receive the tape, it causes the fingers 30 to release their grip on the tape by sliding the pin 38 from under the stop in 33 to permit the spring 35 to open the fingers 30. The article with the tape attached and withdrawn to its normal path of movement by pusher 67 and spring finger 80 is advanced by the oncoming articles to the station where the tape is bound down along the edges of the article as the article is moved by the pusher 81 between the rollers 87 and 88. The article bound with the pressure sensitive tape is withdrawn from between the rollers 87 and 88 by action of the finger plate 90 to the normal path of movement. The article may now be packaged or stacked in any desired manner. Tape dispensing and applicator units embodying my invention may be built into binding and packaging machines.

From the above it is seen that very accurate lengths of pressure sensitive tape are dispensed at very rapid rates with positive control over the tape. Additionally, adjustments for varying the length of tape dispensed and for varying the pressure for applying the tape are easily facilitated.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a device of the character described comprising a means for gripping a length of tape to feed it to a predetermined position to be engaged by an article upon movement of the latter, a means for cutting a desired length of tape after the tape has been fed to said predetermined position, a means for moving said article into engagement with a cut length of tape, and a means operable by said article for actuating the gripping means to release the cut length of tape upon engagement of said article with said cut length of tape.

2. In a pressure sensitive tape dispenser and applicator comprising a means for retaining the end of the tape in an initial position, a means for feeding said tape from said initial position to a predetermined position, a means for cutting said tape so that the cut end remaining is retained in said initial position and the cut piece is retained by said feeding means, a means for moving an article into engagement with said cut piece of tape, and a means operatively connected to said feeding means for releasing the feeding means from said cut piece of tape upon engagement of said article with said piece of tape.

3. In a device for dispensing and applying pressure sensitive tape comprising means for rotatably supporting a supply roll of tape, means for retaining the end of the tape from said supply roll in an initial position, a means for gripping the end of said tape from said retaining means and feeding it to a predetermined position, a means for cutting said tape intermediate of said initial position and said predetermined position so that the cut edge remaining is returned to the initial position and the cut piece of tape remains in the predetermined position, a means for moving an article into engagement with said cut piece of tape and a means operatively connected to said gripping means for actuating the gripping means to release the cut piece of tape upon engagement of said tape by said article.

4. A device of the character described comprising a means for rotatably supporting a supply roll of tape, means for retaining the end of the tape from the supply roll in an initial position, a means for gripping the end of the tape from said retaining means, a locking means for locking the gripping means after the end of the tape has been gripped from the retaining means, a means for moving said gripping means to feed the end of the tape to a predetermined position, a means for cutting said tape so that the cut edge remaining lies in the initial position and the cut piece of tape remains in the predetermined position, a means for moving an article into engagement with said cut piece of tape, a means operatively connected to said gripping means for actuating the locking means to unlock the gripping means to enable the release of the cut piece of tape upon engagement of said tape by said article, and a means for applying the tape engaged by said article to said article.

5. A device for dispensing and applying pressure sensitive tape to articles comprising a supply of tape in the form of a roll rotatably supported and having its leading end maintained in an initial position, means for retaining said leading end of tape in an initial position, means for gripping said leading end of tape from said retaining means and withdrawing it to a predetermined position, means for cutting said tape so that the cut edge remaining is returned to said initial position while the leading end of tape remains under control of said gripping means, means for bringing an article into engagement with said cut piece of tape in a manner that a portion of the tape adheres to the article, thereby leaving a remaining portion of tape to be applied to the article, means for actuating said gripping means to release the cut piece of tape after the article is brought into engagement therewith, and means for applying said remaining portion of tape to said article.

6. A device for dispensing and applying pressure sensitive tape to article comprising a supply of tape in the form of a roll rotatably supported and having its leading end maintained in an initial position, means for retaining said leading end of tape in an initial position, means for gripping said leading end of tape from said retaining means and withdrawing it to a predetermined position, means for cutting said tape so that the cut edge remaining is returned to said initial position under control of said retaining means while the leading end of tape lies in said predetermined position under control of said gripping means, means for bringing an article into engagement with said cut piece of tape while said cut piece of tape remains under control of said gripping means, means for actuating said gripping means to release said cut piece of tape after the same is engaged by said article, and means for applying said cut piece of tape onto said article.

7. In a device for dispensing and applying pressure sensitive tape to articles moving along a conveyor, the combination of means for cutting tape held at a tape dispensing location to predetermined lengths, holding means for positively gripping said cut lengths of tape to hold them in the tape applying position, means for receiving articles from said conveyer, means for laterally moving said article receiving means toward and away from said tape applying position in a manner that a cut piece of tape is caused to adhere to the article, and means operable by said article for actuating said holding means to release the cut length of tape upon engagement of an article therewith.

References Cited in the file of this patent

UNITED STATES PATENTS

| | | |
|---|---|---|
| 1,293,959 | Smith | Feb. 11, 1919 |
| 1,861,144 | Schmiedel | May 31, 1932 |
| 2,630,933 | Charles | Mar. 10, 1953 |